UNITED STATES PATENT OFFICE.

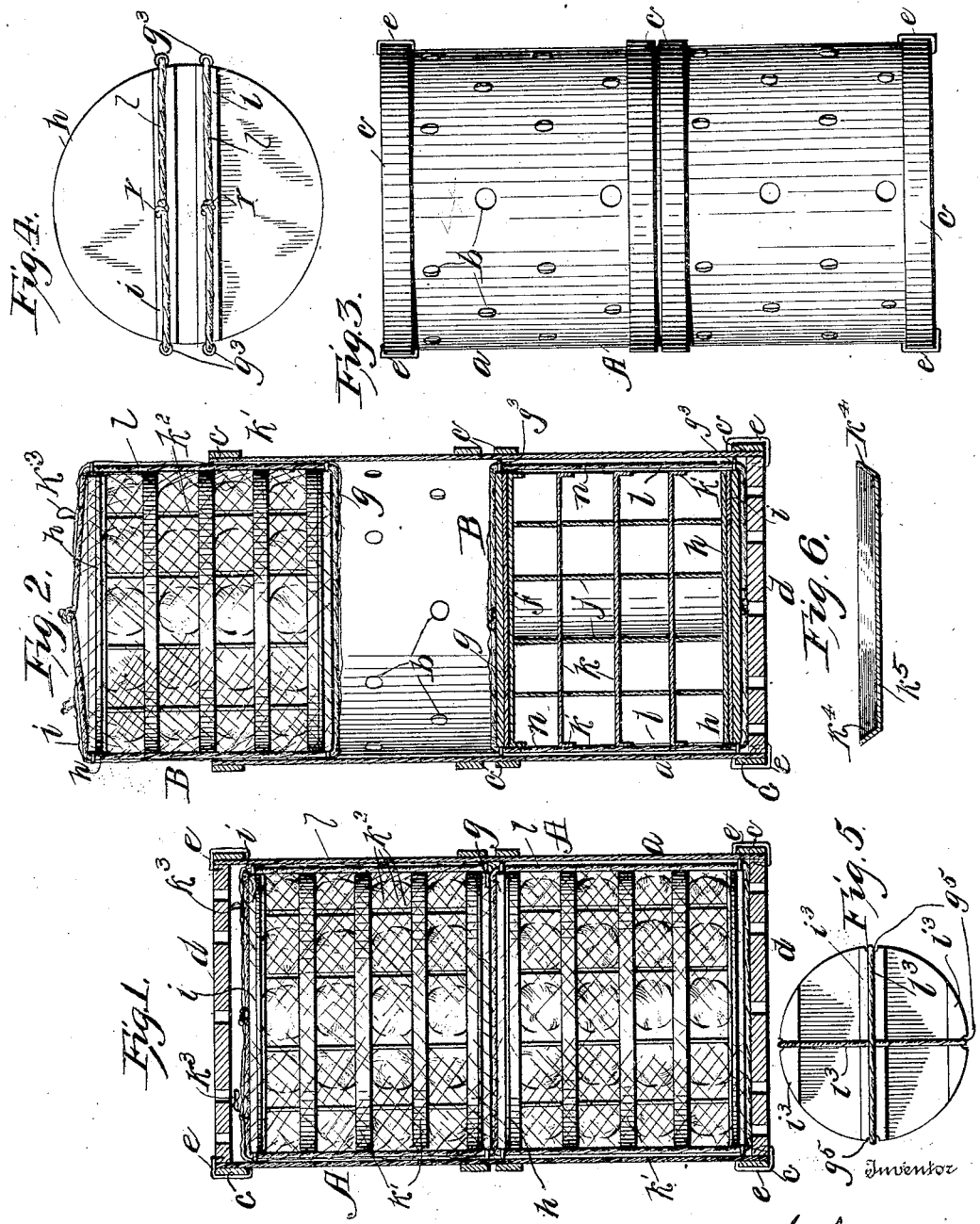

WELLS R. STOKELY, OF ST. AUGUSTINE, FLORIDA.

SHIPPING-CRATE.

No. 877,612.          Specification of Letters Patent.          Patented Jan. 28, 1908.

Application filed March 5, 1907. Serial No. 360,754.

*To all whom it may concern:*

Be it known that I, WELLS R. STOKELY, citizen of the United States, residing at St. Augustine, in the county of St. John and State of Florida, have invented new and useful Improvements in Shipping-Crates, of which the following is a specification.

My invention relates to shipping crates, and has for its object to provide a crate for carrying fruit and vegetables, comprising a casing, and one or more fruit holders removably arranged in the casing in such manner that the fruit or vegetables is inclosed and protected by the casing; the said fruit holder or holders being adapted to be conveniently raised through the upper end of the casing when the cover thereof is removed with a view of displaying the fruit or vegetables to the best advantage to prospective purchasers, and being also adapted to be replaced in the casing with the same facility.

With the foregoing in mind the invention will be fully understood from the following description and claims when the same are read in connection with the accompanying drawings, forming part of this specification, in which:

Figure 1 is a view illustrating the casing of my novel crate in section and two fruit holders in elevation as properly positioned in the casing. Fig. 2 is a view showing the casing in section and the lower fruit holder in section as properly arranged in the lower portion of the casing, and also showing the upper fruit holder in elevation as partly raised through the upper open end of the casing; the head at such end of the casing being removed. Fig. 3 is a view showing my novel crate as a whole in elevation. Fig. 4 is a top plan view of the upper head of the upper fruit holder, showing the arrangement of the cables relative to the said head. Fig. 5 is a view illustrating a modified arrangement of cables relative to one head. Fig. 6 is a section of a modified disk.

Referring by letter to Figs. 1 to 4: A is the casing of my novel crate. This casing may be of any construction compatible with the purpose of my invention without involving departure from the appended claims, though I prefer to have it comprise a cylindrical body $a$ provided with perforations $b$ and surrounded by hoops $c$, and heads $d$ removably arranged in the ends of the body $a$ and detachably secured in such position through the medium of suitable fasteners $e$.

B B are the fruit or vegetable holders of the crate, of which one or more may be employed in the discretion of the party practicing my invention. When but one fruit or vegetable holder is employed it will of course be of a height slightly less than that of the casing A. I prefer, however, to employ two superposed fruit holders as illustrated in Figs. 1 and 2, and as the holders are identical in construction with the exception that the circumferential flanges of the upper holder extend upward and the corresponding flanges of the lower holder extend downward a detailed description of the upper one will suffice to impart a definite understanding of both. Said upper holder comprises a lower or inner head $f$, preferably a veneer, having strengthening strips $g$ arranged on its under or inner side, an upper or outer head $h$, also preferably of veneer, having strengthening strips $i$ on its upper or outer side, horizontal courses of cells $j$, formed of pasteboard or other material suitable to the purpose, arranged between the heads $f$ and $h$, horizontal disks $k$ of pasteboard or similar material interposed between and separating the courses of cells $j$ and having circumferential flanges $k'$, Fig. 1, and means $l$ extending between and connecting the heads $f$ and $h$ and designed to hold the said heads under pressure against the courses of cells and the fruit or vegetables contained in the said cells with a view of preventing lateral displacement of any of the fruit or vegetable when the holders are raised from the case A in the manner hereinafter set forth in detail.

The connecting means $l$ mentioned may be of any description agreeable to the purpose of my invention without involving departure from the scope thereof, though I prefer to employ for the purpose two, more or less, cables of rope or other suitable material as illustrated. The said cables $l$ are provided with loops arranged under the lower head $f$ and strengthening strips $g$ and held against lateral movement by eyes $g^3$ on the strips, or other suitable means; and they also have vertical portions which extend up outside the disks $k$, and through eyes $g^3$ on the upper strips $i$ and terminate at their upper ends in portions which are tied or otherwise tightly connected together, as indicated by $r$ and best shown in Figs. 2 and 4. In addition to connecting the heads $f$ and $h$ and holding said heads under pressure against the courses of cells and fruit in the manner set forth in the foregoing, the means $l$ is designed to form a convenient handle through which convenient hold may be taken of the fruit or vegetable holders B with a view of lifting said holders from and replacing the same in the casing A.

By virtue of the vertical portions of the cables being arranged outside of the disks $k$ as described, it will be apparent that in packing the holders B, a course of cells and fruit or vegetables may be placed on the lower head, and then a disk $k$ may be placed on the cells and fruit or vegetables, and this operation may be repeated until the upper head is placed in position, when the vertical portions of the cables may be threaded through the eyes $q^3$ of said upper head, and the ends of the cables may be tied above the same. During the packing of fruit or vegetables in the holder as described, the cables may be looped over opposite portions of the casing A. Any means other than eyes may be used to hold the cables in proper relation to the heads of the holder without involving departure from my invention. At this point I desire it understood that when cables are employed as the means for connecting the heads and holding the same under pressure against the courses of cells and the fruit therein contained, and for lifting the holders, the said cables may be of rope as shown or of other material suitable to the purpose of my invention.

By reason of the disks $k$ having circumferential flanges $k'$ it will be seen that said disks may be used, when the holders are taken apart, as trays to carry the fruit or vegetables; also, that when desired, one flanged disk may be inverted over another to form a substantially closed package for carrying fruit or vegetables.

In addition to the elements specified in the foregoing, I prefer to have each of the holders B comprise a sack $k^2$ of net-work or reticulated material. The said sack receives the remainder of the holder, and has its mouth tightened over one head of the holder through the medium of a draw-string $k^3$, or has said mouth secured on said head in any other approved manner. As will be observed by reference to Figs. 1 and 2, the mouth of the sack of the lower holder is preferably arranged at the lower end of the holder, and the mouth of the sack of the upper holder is preferably located at the upper end of said holder.

My novel crate is designed to be shipped in the condition shown in Fig. 1—that is to say with both heads $d$ of the casing A secured in the body $a$ thereof, and with the fruit holders B superposed and arranged in reverse order in the casing. With the parts thus arranged, it will be apparent that the body $a$ of the casing will prevent displacement of the fruit or vegetables from the holders B, even when the net-work sacks $k^2$ are omitted, and the openings $b$ in said casing body $a$ will permit free circulation of air through the fruit or vegetables. Then when the crate arrives at its destination one of its heads $d$ is removed. With this done the upper holder B may be raised through the upper open end of the casing A to expose its contents to inspection, and may be as conveniently replaced in the casing and on the lower holder. As will be readily observed the upper portion of the cable or cables $l$ constitutes a convenient hand hold for facilitating the raising and lowering of the upper holder B. Then when the crate as a whole is inverted and the other head $d$ thereof is removed, it will be observed that the other holder B may be raised and lowered with respect to the casing A in the same manner as the first mentioned holder. In this way all of the fruit contained in the crate may be easily and thoroughly examined by a prospective purchaser without the necessity of either disarranging or handling the fruit. Again it will be seen that the net-work sacks $k^2$ will prevent pinching or fingering of the fruit or vegetables, and will preclude the surreptitious removal of a piece of fruit or vegetable when the holders are lifted from the box and also when the holders are hung up in a store or other place by means of the cables $l$, and this without in any way hiding the fruit or vegetables from view. In this latter connection it will be understood that when it is desired to hang one of the holders B on an overhead hook for exhibition purposes, the grocer has but to lift the holder and place the upper loops of the cables $l$ on the hook.

The circumferential flanges of the disks may be upright as shown in Figs. 1 and 2 or may be flared as shown in Fig. 6 in which $k^5$ is a disk and $k^4$ the flared flange thereof; the flared flange being advantageous in some cases since it does not tend to crease or dig into the fruit.

The cables of the fruit holders may be arranged in any desired manner relative to the heads without involving departure from the scope of my invention as claimed. For instance each head may have three reinforcing strips $i^3$ as shown in Fig. 5, and four notches $g^5$ in the perimeter of the head, and two cables $l^3$ arranged at right angles to each other may be seated in said notches. It will be apparent that the heads reinforced as in Fig. 6 will be stiff and strong, and that the arrangement of cables in said figure is advantageous since it will enable the holders to hang steady from a hook or the like.

The parts constructed and relatively arranged as herein described constitute the preferred embodiment of my invention, but I do not desire to be understood as confining myself to the herein described specific construction and relative arrangement of parts inasmuch as various changes in the form, construction and relative arrangement of parts may be made in practice without involving departure from the scope of my invention as defined in the appended claims.

Having described my invention, what I claim and desire to secure by Letters-Patent, is:

1. The combination in means for shipping fruit or vegetables, of a casing open at one end, removable means for closing said end of the casing, and a fruit or vegetable holder removably arranged in the casing and comprising lower and upper heads, horizontal courses of cells arranged one above the other between the heads; the outer cells of each course being open at their outer sides, horizontal disks interposed between the courses of cells and having circumferential flanges, of a less height than the cells, each surrounding the adjacent course of cells, and opposite cables attached to one head and extending therefrom, in the direction of the height of the holder at points outside and past the courses of cells and disks and the other head, and having their end portions connected together at the outer side of said other head.

2. The combination in means for shipping fruit or vegetables, of a casing open at one end, removable means for closing said end of the casing, and a fruit or vegetable holder removably arranged in the casing and comprising lower and upper heads, horizontal courses of cells arranged one above the other between the heads; the outer cells of each course being open at their outer sides, horizontal disks interposed between the courses of cells and having circumferential flanges, of a less height than the cells, each surrounding the adjacent course of cells, opposite cables attached to one head and extending therefrom, in the direction of the height of the holder at points outside and past the courses of cells and disks and the other head, and having their end portions connected together at the outer side of said other head, and a sack of net-work material receiving the heads and the cells and separating disks and having a mouth secured at the outer side of said other head.

In testimony whereof I have hereunto set my hand in presence of two subscribing witnesses.

WELLS R. STOKELY.

Witnesses:
JAMES J. SHEEHY, Jr.,
THOS. E. TURKIN.